(12) United States Patent
Friedrichs

(10) Patent No.: US 7,134,308 B2
(45) Date of Patent: Nov. 14, 2006

(54) EXTRUSION PRESS TOOL FOR PRODUCING A CYLINDRICAL BODY CONSISTING OF A PLASTIC MASS

(76) Inventor: Arno Friedrichs, Grübaum 3, 95326 Kulmbach (DE)

( * ) Notice: Subject to any disclaimer, the term of this patent is extended or adjusted under 35 U.S.C. 154(b) by 16 days.

(21) Appl. No.: 10/519,632

(22) PCT Filed: Jun. 27, 2003

(86) PCT No.: PCT/EP03/06843

§ 371 (c)(1),
(2), (4) Date: Dec. 28, 2004

(87) PCT Pub. No.: WO2004/002641

PCT Pub. Date: Jan. 8, 2004

(65) Prior Publication Data

US 2005/0235722 A1    Oct. 27, 2005

(30) Foreign Application Priority Data

Jun. 29, 2002    (DE) ............................. 102 29 325

(51) Int. Cl.
*B21C 23/04* (2006.01)
*A01J 21/00* (2006.01)

(52) U.S. Cl. .......................... 72/264; 72/268; 425/381; 425/466

(58) Field of Classification Search ................ 72/253.1, 72/256, 260, 263, 264, 268, 258, 262; 425/381, 425/466, 467, 468; 264/167, 209.2
See application file for complete search history.

(56) References Cited

U.S. PATENT DOCUMENTS

| 2,241,543 | A | * | 5/1941 | Deitz, Jr. ..................... 72/263 |
|---|---|---|---|---|
| 2,422,994 | A | | 6/1947 | Taylor |
| 3,396,676 | A | | 8/1968 | Hasten et al. |
| 5,116,659 | A | * | 5/1992 | Glatzle et al. ............... 428/188 |
| 5,438,858 | A | | 8/1995 | Friedrichs |
| 5,557,962 | A | * | 9/1996 | Takikawa ..................... 72/260 |
| 5,780,063 | A | | 7/1998 | Friedrichs |
| 5,904,939 | A | * | 5/1999 | Friedrichs ................... 425/381 |
| 6,248,277 | B1 | | 6/2001 | Friedrichs |
| 6,470,726 | B1 | * | 10/2002 | Murata et al. ................ 72/260 |
| 6,699,430 | B1 | | 3/2004 | Friedrichs |

FOREIGN PATENT DOCUMENTS

| DE | 41 20 166 | 1/1993 |
|---|---|---|
| DE | 42 42 336 | 6/1994 |
| DE | 196 44 447 | 4/1998 |
| DE | 199 42 966 | 3/2001 |
| JP | 01 156405 | 6/1989 |

\* cited by examiner

*Primary Examiner*—Ed Tolan
(74) *Attorney, Agent, or Firm*—Collard & Roe, P.C.

(57) ABSTRACT

The invention relates to an extruder tool for producing a cylindrical body which consists of plastic mass and has at least one recess extending in the interior thereof. The extruder tool comprises an extruder nozzle which has a narrowing region and a nozzle mouthpiece. The nozzle mouthpiece forms a cylindrical channel. In addition, a carrier device is provided, at which a number, which corresponds with the number of internal recesses, of threads is fastened or which has a number, which corresponds with the number of internal recesses, of channels for threadlike pressing of a volatile filler material into the mass flow. The carrier device consists of a number, which corresponds with the number of internal recesses, of carrier elements preferably of pin-like construction. Each of the carrier elements is fastened to the extruder nozzle in the region of the nozzle mouthpiece or in the tapering region and is preferably adjustable in radial direction.

10 Claims, 3 Drawing Sheets

EXTRUSION PRESS TOOL FOR PRODUCING A CYLINDRICAL BODY CONSISTING OF A PLASTIC MASS

CROSS REFERENCE TO RELATED APPLICATIONS

Applicant claims priority under 35 U.S.C. §119 of German application number 102 29 325.2, filed on Jun. 29, 2002; Applicant also claims priority under 35 U.S.C. §365 of PCT/EP2003/006843 filed on Jun. 27, 2003. The international application under PCT article 21(2) was not published in English.

The invention relates to an extruder tool for producing a cylindrical body consisting of plastic mass.

An extruder tool for producing a hard-metal or ceramic rod with twisted internal bores is already known from DE 41 20 166 C2. The known extruder tool comprises an extruder nozzle, the mouthpiece of which has a smooth cylindrical channel. In addition, the known extruder tool is provided with a carrier which is arranged at a mandrel coaxially within the extruder nozzle and which has a number, which corresponds with the number of internal bores, of elastic threads protruding into the nozzle mouthpiece and/or channels or bores for threadlike pressing of a plastic material into the mass flow. These threads, channels or bores are fastened or arranged in correspondence with the position of the at least one internal bore at predetermined radial spacings from the axis. The carrier is constructed as a blade-free hub body. The hub body and/or the nozzle mouthpiece is or are associated with a drive device by which a predetermined relative rotational movement, which is matched to the extrusion speed of the mass, between the hub body and the nozzle mouthpiece can be produced for creating the at least one twisted internal channel in the extruded blank.

Moreover, a method and device for producing a sintered metal blank with internally disposed helical recesses is known from DE 199 42 966 C2. In that case the plastic body is initially produced with a substantially rectilinear course of the internal recess. The plastic body is thereafter cut off to a predetermined length and subsequently subjected to a rolling movement by means of a friction surface arrangement while being supported over its entire length on a bed. The speed of this rolling motion linearly and constantly changes over the length of the body so that the body is uniformly twisted.

The invention has the object of improving the production of a cylindrical body which consists of plastic mass and has a recess extending in the interior thereof.

This object is met by an extruder tool for producing a cylindrical body, which consists of plastic mass and has at least one recess extending in the interior thereof. The extruder tool includes an extruder nozzle with a tapering region and a nozzle mouthpiece, which forms a cylindrical channel, and a carrier device at which a number, which corresponds with the number of internal recesses, of threads is fastened or which has a number, which corresponds with the number of internal recesses, of channels for threadlike pressing of a volatile filler material into the mass flow. The carrier device consists of a number, which corresponds with the number of internal recesses, of carrier elements and each of the carrier elements is fastened to the extruder nozzle in the region of the nozzle mouthpiece or in the tapering region, wherein each of the carrier elements (3, 4) is adjustable in radial direction. Advantageous refinements and developments of the invention are discussed below.

The advantages of the invention consist particularly in that the radial spacing of the at least one internal recess of the cylindrical body consisting of plastic mass can be set quickly and in simple manner from the outer circumference or from the surface of the cylindrical body. Further advantages of the invention are evident from the following explanation of an example of embodiment by reference to the drawings, in which those components of an extruder tool which are necessary for understanding of the invention are illustrated, wherein.

Figure 1:
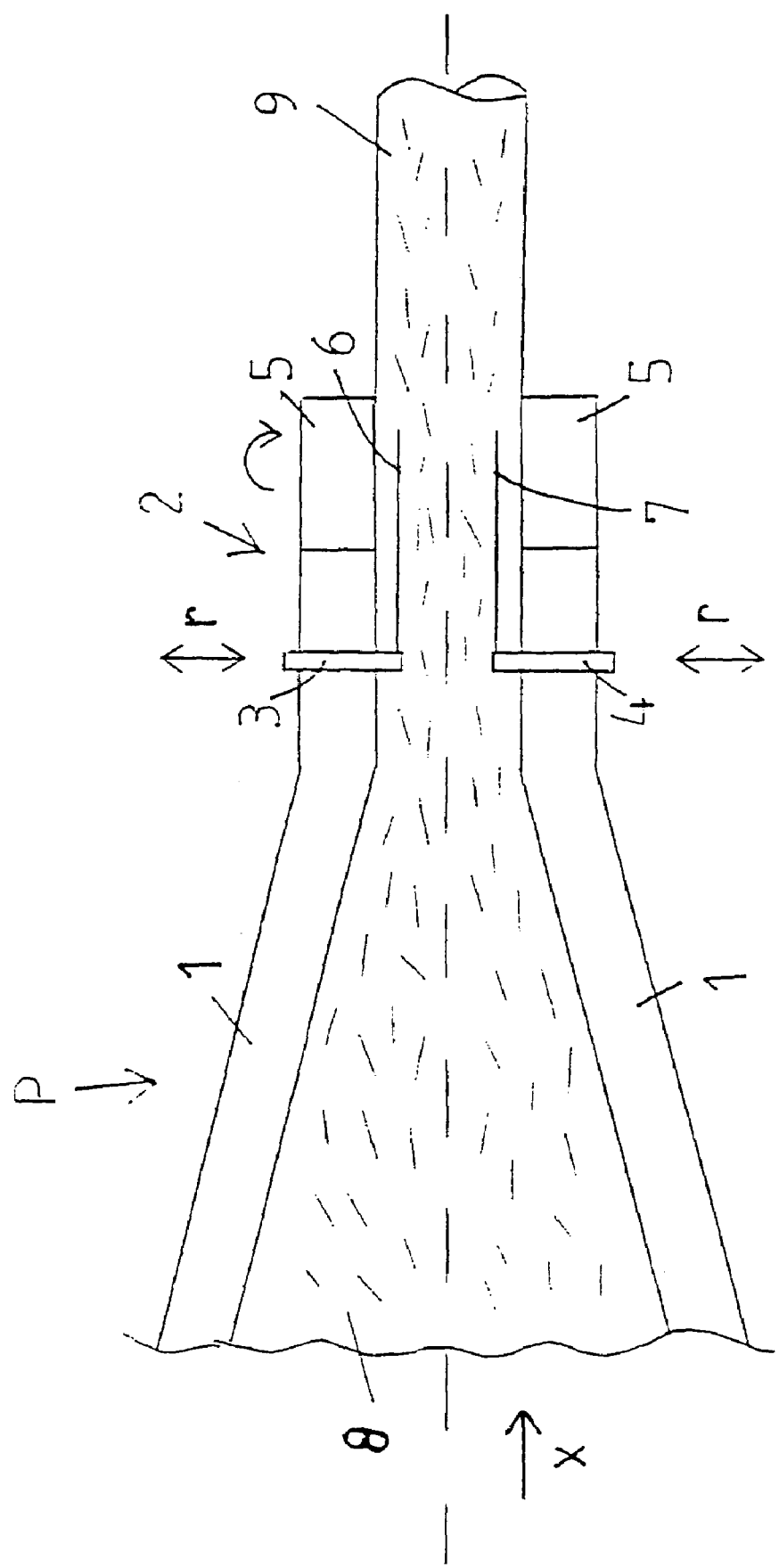
FIG. 1 shows a first example of embodiment for the invention.

FIG. 1 shows a first example of embodiment for the invention. The illustrated extruder tool comprises an extruder nozzle P which has a tapering region 1 and a nozzle mouthpiece 2. The nozzle mouthpiece 2 forms a cylindrical channel. Plastic mass 8 is forced through this extruder nozzle in direction x so that the plastic mass leaving the nozzle mouthpiece forms a cylindrical body 9 consisting of plastic mass. This is then cut off to a desired length outside the extruder tool for formation of a blank. The blank is further processed to form an end product, for example a hard-metal rod, a ceramic rod or a powdered-steel rod, particularly a drill bit.

The cylindrical body 9 leaving the nozzle mouthpiece 2 has recesses helically extending in the interior thereof. If the end product is a drill bit, then these recesses serve as cooling channels through which cooling liquid is conducted to the cutting or working region of the drill bit during the drilling process.

Production of these helically extending recesses is carried out in a first form of embodiment of the invention with use of elastic threads and an end region 5 of the nozzle mouthpiece 2, which is constructed to be rotatable or rotating relative to the tapering region 1 of the extruder nozzle P.

Two resilient threads which are provided with the reference numerals 6 and 7 are shown in FIG. 1. These resilient threads are each fastened to a respective thread holder 3 or 4. The thread holders, which can consist of a metal, are each of pin-like construction and are guided through a bore in the nozzle mouthpiece 2 or a bore in the narrowing region 1 of the extruder nozzle and fastened thereto. They project into the cylindrical channel and are—as is indicated by the double arrow r—adjustable in radial direction. Through this adjustability the spacing of the respective internal recess, which arises by virtue of the threads during the extrusion process, from the surface or the outer circumference of the cylindrical body can be set in simple manner.

The cylindrical body 9 leaving the press tool accordingly has, in the case of the illustrated example of embodiment, two helically extending internal recesses.

The radial adjustability of the thread holders 3 and 4 is given either by a screwthread in the nozzle mouthpiece 2 or in the narrowing region of the extruder nozzle or by a setting drive. The radial adjustment can be undertaken by an operative.

The length of the threads 6 and 7, the length of the rotatable end region 5 of the nozzle mouthpiece 2 and the rotational speed of the end region 5 of the nozzle mouthpiece 2 are dependent on the respective case of use and can be optimised in dependence on the desired pitch angle of the helical internal recesses.

Figure 2:
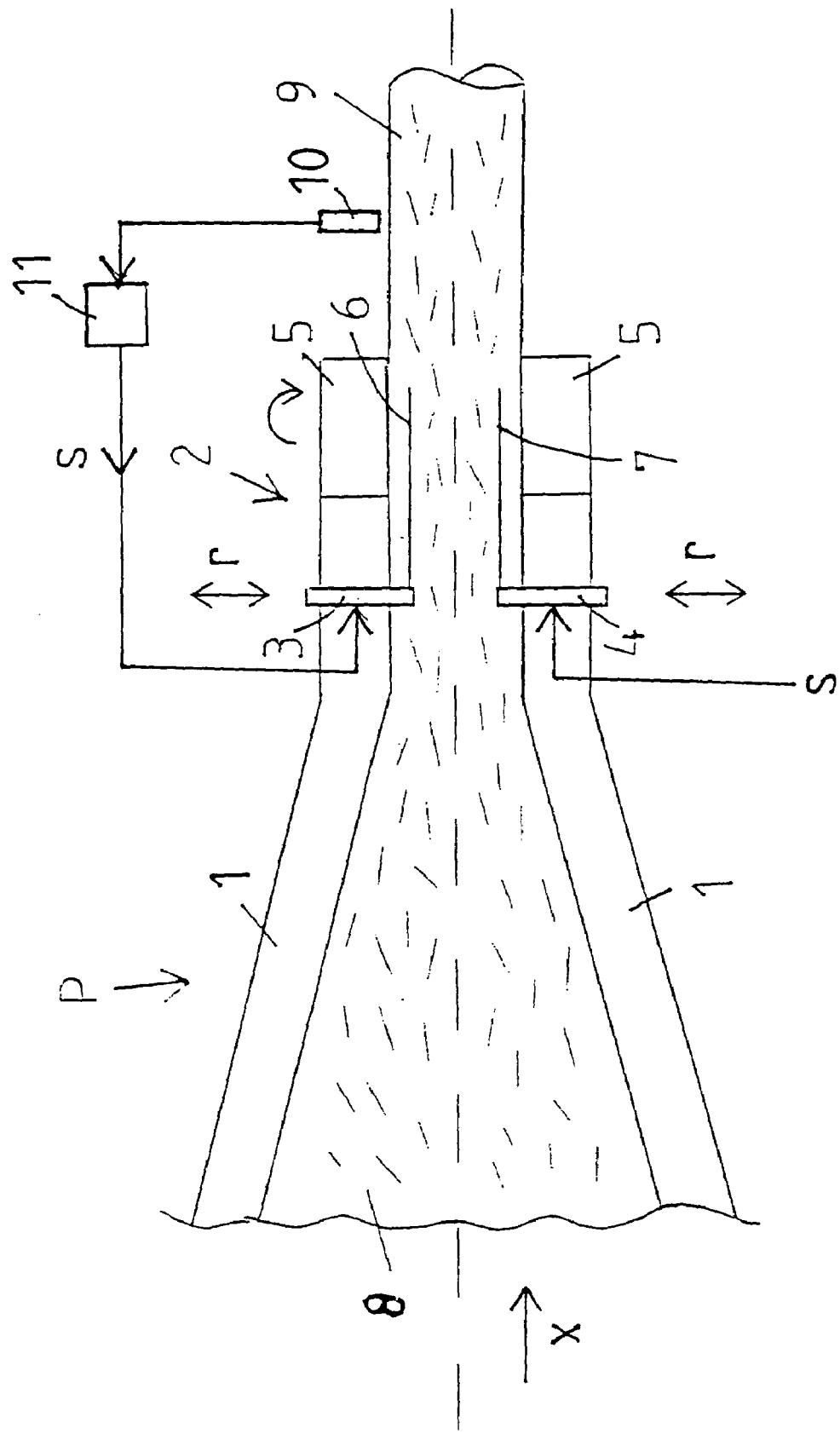
FIG. 2 shows a second example of embodiment for the invention.

FIG. 2 shows a second example of embodiment for the invention. This differs from the first example of embodiment in that a sensor 10 is provided outside or also inside the extruder nozzle. This sensor serves for detection or determination of the spacing of the internal recesses of the body from the outer circumference or surface thereof. The output signals of this sensor are fed to a setting unit 11 which provides setting signals s at its output. An automatic radial adjustment of the thread holders 3 and 4 is carried out by means of these setting signals s.

Figure 3:
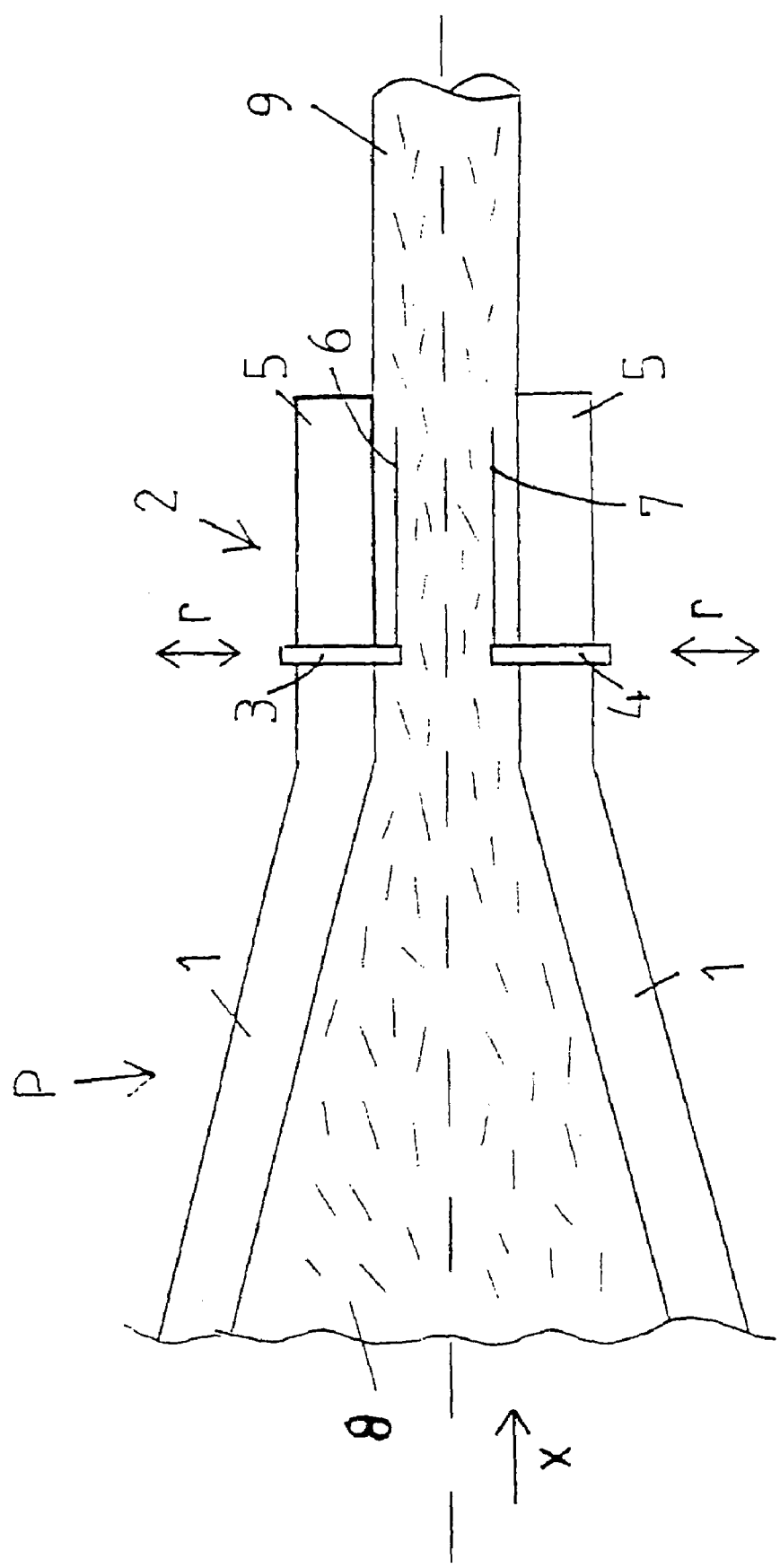
FIG. 3 shows a third example of embodiment for the invention.

FIG. 3 shows a third example of embodiment for the invention. According to this third example of embodiment a cylindrical body 9 consisting of plastic mass and having rectilinearly extending recesses in the interior thereof is produced by means of the extruder tool. In the case of this example of embodiment the nozzle mouthpiece 2 is of integral construction and does not have a rotatable or rotating end region. The cylindrical body 9 leaving the extruder tool is cut off to a desired length for formation of a blank. This blank can then be further processed to form a rod-shaped end product which has rectilinear recesses. Alternatively thereto this blank can also—as is described in DE 199 42 966 C2—be subjected to a rolling motion by means of a friction surface arrangement while being supported over its entire length on a bed, so that helical recesses are formed in the interior of the blank.

The parts of the thread holder elements 3 and 4 protruding into the cylindrical channel are preferably formed to taper at the inflow and/or outflow end in order to reduce the friction arising within the extruder nozzle.

The threads 6 and 7 are preferably provided at their ends with terminating members by which the diameter of the recess in the cylindrical body is determined. The cross-sectional area of the threads and/or the cross-sectional area of the terminating members can be round or non-round. This enables, for example, an optimum adaptation of the cooling channels of a drill bit to the chip spaces of the drill bit, which are formed in the drill bit in the course of further processing of the blank.

In the above examples of embodiment there was always described a carrier device, the carrier elements of which are thread holder elements to each of which a respective thread is fastened.

Alternatively thereto the carrier device can also comprise carrier elements which are provided with channels and through which volatile filler material can be pressed into the mass flow. These channels can also be formed to be round or non-round in order to predetermine the cross-sectional shape of the later internal recesses in desired manner. The volatile filler material is brought from outside through a feed duct into the channel of the respective carrier element. It serves as a form of space reservation for the later internal recesses and is removed from the internal recesses in a downstream process. For example, condensation of the filler material is achieved by heating, which filler material then flows out of the internal recesses without further changes in the shape of the cylindrical body then occurring.

Reference Numeral List
1 tapering region of the extruder nozzle
2 nozzle mouthpiece
3 thread holder element
4 thread holder element
5 end region of the nozzle mouthpiece
6 thread
7 thread
8 plastic mass
9 cylindrical body
10 sensor
11 setting unit
P extruder nozzle
r radial direction
s setting signal
x extrusion direction

The invention claimed is:

1. An extruder tool for producing a plastic cylindrical extrusion having at least one inner bore comprising:
   (a) an extruder nozzle having a tapered region and an opening piece having a cylindrical channel;
   (b) a carrier support having a number of filaments secured to said carrier support, the number of filaments corresponding to a number of inner bores to be produced, or having a number of channels corresponding to the number of inner bores to be produced for pressing a volatile filling material into an extrudable material as the material is being extruded, said carrier support comprising a number of radially adjustable carrier elements corresponding to the number of inner bores to be produced, each carrier element being secured to the extruder nozzle near the opening piece or in the tapered region; and
   (c) a sensor for determining a spacing of the at least one inner bore from an outer surface of the extrusion, said sensor outputting signals to a setting unit for radial adjustment of the carrier elements in dependence on the spacing determined by the sensor.

2. An extruder tool for producing a plastic cylindrical extrusion having at least one inner bore comprising:
   (a) an extruder nozzle having a tapered region and an opening piece having a cylindrical channel; and
   (b) a carrier support having a number of filaments secured to said carrier support, the number of filaments corresponding to a number of inner bores to be produced, or having a number of channels corresponding to the number of inner bores to be produced for pressing a volatile filling material into an extrudable material as the material is being extruded, said carrier support comprising a number of radially adjustable carrier elements corresponding to the number of inner bores to be produced, each carrier element corresponding to one of the number of the inner bores to be produced, each carrier element being radially adjustable to set the radial spacing of the corresponding inner bore from an outer circumference or the surface of the cylindrical extrusion, and each carrier element being secured to the extruder nozzle near the opening piece or in the tapered region.

3. The extruder tool according to claim 2, wherein each of the carrier elements is radially adjustable by a thread or a setting drive.

4. The extruder tool according to claim 2, wherein each of the carrier elements is of pin-like construction and led through a bore in the extruder nozzle.

5. The extruder tool according to claim 2, wherein the opening piece has an end region, said end region being rotatable relative to the tapered region of the extruder nozzle for production of a helical course of the at least one inner bore.

6. The extruder tool according to claim 2, wherein the carrier elements have parts protruding into the cylindrical channel formed to taper at an inflow and/or outflow end.

7. The extruder tool according to claim 2, wherein the carrier elements comprise filament holder elements at each of which a respective filament is secured.

8. The extruder according to claim 7, wherein each filament has a round or non-round cross-sectional area and/or is provided with a round or non-round terminating member.

9. The extruder tool according to claim 2, wherein the carrier elements have channels through which volatile filler material can be pressed into the extrudable material as the material is being extruded.

10. The extruder tool according to claim 9, wherein the channels have a round or non-round cross-sectional area.

* * * * *